US009414549B2

(12) United States Patent
Toye

(10) Patent No.: US 9,414,549 B2
(45) Date of Patent: Aug. 16, 2016

(54) REFLECTIVE NETTING MATERIAL

(71) Applicant: Extenday IP Limited, Auckland (NZ)

(72) Inventor: Jonathan Dallas Toye, Auckland (NZ)

(73) Assignee: Extenday IP Limited, Auckland (NZ)

( * ) Notice: Subject to any disclaimer, the term of this patent is extended or adjusted under 35 U.S.C. 154(b) by 0 days.

(21) Appl. No.: 13/781,463

(22) Filed: Feb. 28, 2013

(65) Prior Publication Data

US 2013/0239472 A1 Sep. 19, 2013

Related U.S. Application Data

(63) Continuation of application No. 13/264,309, filed as application No. PCT/NZ2010/000075 on Apr. 16, 2010, now abandoned.

(30) Foreign Application Priority Data

Apr. 16, 2009  (NZ) ........................................ 576327

(51) Int. Cl.
*A01G 13/00* (2006.01)
*A01G 13/02* (2006.01)
*B32B 27/12* (2006.01)

(52) U.S. Cl.
CPC ............ *A01G 13/0206* (2013.01); *B32B 27/12* (2013.01); *Y10T 442/10* (2015.04); *Y10T 442/102* (2015.04); *Y10T 442/152* (2015.04); *Y10T 442/183* (2015.04); *Y10T 442/184* (2015.04); *Y10T 442/188* (2015.04)

(58) Field of Classification Search
CPC .. A01G 13/0206; A01G 13/02; A01G 9/1438

USPC ................. 47/31, 31.1, 32.3, 20.1, 29.1, 29.4
See application file for complete search history.

(56) References Cited

U.S. PATENT DOCUMENTS

| 316,261 A | 4/1885 | Hart, Jr. |
| 378,597 A | 2/1888 | Karmer et al. |
| 5,024,834 A | 8/1894 | Mayent |

(Continued)

FOREIGN PATENT DOCUMENTS

| CN | 201146722 Y | 1/2008 |
| EP | 1728417 A2 | 12/2006 |

(Continued)

OTHER PUBLICATIONS

Oren-Shamir, Michal "Coloured Shade Nets Can Improve he Yield and Quality of Green Decorative Branches of Pittosporum Variegatum," Journal of Horticultural Science and Biotechnology, (2001), pp. 353-361, 76 (3).

*Primary Examiner* — Marc Burgess
(74) *Attorney, Agent, or Firm* — Hovey Williams LLP

(57) ABSTRACT

A reflective netting material suitable for providing over and/or adjacent the plant as bird netting, insect netting, shadecloth netting, windbreak netting, or hail protection netting, is knitted, woven, or non-woven, from a synthetic monofilament, yarn, or tape or combination thereof formed from a resin comprising at least one white pigment such that the monofilament, yarn, or tape reflects at least 30% solar radiation on average across the UV (wavelength about 280-400 nm), visible (wavelength about 400-700 nm) and very near infrared (wavelength about 700-800 nm) ranges, and which transmits at least 10% or 5% on average of solar radiation across the wavelength range about 800-2500 nm.

35 Claims, 6 Drawing Sheets

(56) References Cited

U.S. PATENT DOCUMENTS

| | | |
|---|---|---|
| 544,971 A | 8/1895 | Donnelly |
| 568,221 A | 9/1896 | Walton |
| 621,190 A | 3/1899 | Weiss et al. |
| 823,317 A | 6/1906 | Best |
| 1,037,334 A | 9/1912 | Schneider |
| 1,737,300 A | 11/1929 | Dayton |
| 2,328,474 A | 8/1943 | Lewis |
| 2,459,735 A | 1/1949 | McKinnon |
| 2,511,644 A | 6/1950 | Liss |
| 2,680,891 A | 6/1954 | Petzke |
| 2,820,269 A | 1/1958 | Wolff |
| 2,900,692 A | 8/1959 | Lincoln |
| 2,940,219 A * | 6/1960 | Schiller .............. A01G 13/0268 47/31.1 |
| 3,581,436 A | 6/1971 | Basiger |
| 3,697,347 A | 10/1972 | Lehmann |
| 3,970,227 A | 7/1976 | Hardy |
| 3,990,650 A | 11/1976 | Devine |
| 4,236,688 A | 12/1980 | Wilk |
| 4,574,100 A * | 3/1986 | Mercer .................. B29D 28/00 264/288.8 |
| 4,649,954 A | 3/1987 | Dunwoody |
| 4,749,625 A | 6/1988 | Obayashi et al. |
| 4,979,714 A | 12/1990 | Russell et al. |
| 5,056,247 A | 10/1991 | Loomie |
| 5,067,205 A | 11/1991 | Chen et al. |
| 5,097,624 A | 3/1992 | Klayman et al. |
| 5,406,680 A | 4/1995 | Silverberg |
| 5,465,596 A | 11/1995 | Park |
| 5,546,639 A | 8/1996 | Lacore et al. |
| 5,638,584 A | 6/1997 | De Anfrasio |
| 5,771,630 A * | 6/1998 | Harasawa et al. .............. 47/29.4 |
| 6,014,794 A | 1/2000 | McCoy |
| 6,081,975 A | 7/2000 | Norrby |
| 6,122,806 A | 9/2000 | Umezawa et al. |
| 6,339,898 B1 | 1/2002 | Toye |
| 6,421,954 B2 | 7/2002 | Ko |
| 6,586,350 B2 | 7/2003 | Guberman et al. |
| 6,647,662 B2 | 11/2003 | Toye |
| 6,658,789 B2 | 12/2003 | Klayman |
| 6,796,083 B2 * | 9/2004 | Hadar .................... A01G 13/10 47/31 |
| 6,823,565 B2 | 11/2004 | Toye |
| 7,195,256 B2 | 3/2007 | Toye et al. |
| 7,326,660 B2 | 2/2008 | Walraevens et al. |
| 2002/0056225 A1 * | 5/2002 | Shahak et al. ................. 47/32.3 |
| 2007/0266624 A1 | 11/2007 | Tanaka |
| 2007/0266625 A1 | 11/2007 | Markis et al. |

FOREIGN PATENT DOCUMENTS

| | | |
|---|---|---|
| FR | 2352204 | 12/1977 |
| FR | 2404759 | 4/1979 |
| GB | 2098247 | 11/1982 |
| GB | 2098247 A | 11/1982 |
| JP | 07298793 | 11/1995 |
| JP | 07298793 A | 11/1995 |
| JP | 2008022796 | 2/2008 |
| JP | 2008148592 A | 7/2008 |
| NZ | 207424 | 7/1983 |
| NZ | 517454 | 11/1997 |
| NZ | 570110 | 1/2007 |
| WO | 0219800 | 3/2002 |
| WO | 2006027637 | 3/2006 |
| WO | 2007059345 | 5/2007 |

* cited by examiner

REFLECTIVE NETTING MATERIAL

RELATED APPLICATION

This application is a continuation of U.S. patent application Ser. No. 13/264,309, filed Oct. 13, 1022, which is the National Stage of International Application No. PCT/NZ2010/000075 filed Apr. 16, 2010 claiming the benefit of New Zealand Patent Application No. 576327 filed Apr. 16, 2009, the entire disclosures of each of which are hereby incorporated by reference herein.

FIELD OF INVENTION

The invention relates to netting materials and particularly but not exclusively to netting materials for use as bird netting, insect netting, shadecloth netting, windbreak netting, or hail protection netting for example or in other agricultural applications.

BACKGROUND

Bird netting, insect netting, shadecloth netting, windbreak netting, or hail protection netting may be placed near plants to protect for example annual plants, perennial plants, fruit trees, or grape vines, from birds, insects, excessive sun, wind, or hail. Typically the netting is supported over the plant(s) and/or as a vertical and/or angled wall or walls near the plant(s), by for example cables or wires between posts positioned along the rows of plants in a garden, field crop, orchard or vineyard, or is draped over the plant(s) or is laid on the ground.

SUMMARY OF INVENTION

In broad terms in one aspect the invention comprises a reflective netting material which is knitted, woven, or non-woven, from a synthetic monofilament, yarn, or tape or combination thereof formed from a resin comprising at least one pigment such that the monofilament, yarn, or tape reflects at least 30% solar radiation on average across the UV (wavelength about 280-400 nm), visible (wavelength about 400-700 nm) and very near infrared (wavelength about 700-800 nm) ranges, and which transmits at least 10% or 5% on average of solar radiation across the wavelength range about 800-2500 nm.

In broad terms in another aspect the invention comprises a reflective netting material which is knitted, woven, or non-woven, from a synthetic monofilament, yarn, or tape or combination thereof formed from a resin comprising at least one pigment such that the monofilament, yarn, or tape reflects at least 40% solar radiation on average across the UV (wavelength about 280-400 nm), visible (wavelength about 400-700 nm) and very near infrared (wavelength about 700-800 nm) ranges, and which transmits at least 10% or 5% on average of solar radiation across the wavelength range about 800-2500 nm.

In some embodiments the monofilament, yarn, or tape reflects more solar radiation than it transmits and absorbs in the UV, visible, and very near infrared ranges.

In some embodiments the monofilament, yarn, or tape transmits at least 15% or at least 20% of solar radiation on average in the wavelength range about 800-2500 nm.

In broad terms in another aspect the invention comprises a reflective netting material knitted, woven or non-woven from a synthetic monofilament, yarn, or tape or a combination thereof, formed from a resin comprising more than 4% by weight of a white pigment chosen from zirconium, strontium, barium, magnesium, zinc, calcium, titanium, and potassium pigments.

In broad terms in another aspect the invention comprises a reflective netting material knitted, woven or non-woven from a synthetic monofilament, yarn, or tape or a combination thereof, formed from a resin comprising more than 8% by weight of a white pigment chosen from zirconium, strontium, barium, magnesium, zinc, calcium, titanium, and potassium pigments.

In certain embodiments the reflective netting material is knitted, woven or non-woven from a synthetic monofilament, yarn, or tape or a combination thereof, formed from a resin comprising at least 10%, at least 12% or at least 14%, or at least 16%, or at least 18% or 20% or 25% or 30% by weight of a white pigment.

In certain embodiments the white pigment may be present in the form of particles of size 0.02-5 microns or 0.1-3 microns.

In broad terms in another aspect the invention comprises a reflective netting material knitted, woven or non-woven from a synthetic monofilament, yarn, or tape or a combination thereof formed from a resin comprising at least one white pigment, which resin has been formed by mixing a masterbatch consisting essentially of 10 to 90% by weight of a white pigment or combination of pigments chosen from zirconium, strontium, barium, magnesium, zinc calcium, titanium, and potassium pigments, and a first polymer, with a second polymer such that the resin (masterbatch) comprising the white pigment comprises between about 4 to 50% by weight of the total mixture.

In broad terms in another aspect the invention comprises a reflective netting material knitted, woven or non-woven from a synthetic monofilament, yarn, or tape or a combination thereof formed from a resin comprising at least one white pigment, which resin has been formed by mixing a masterbatch consisting essentially of 20 to 90% by weight of a white pigment or combination of pigments chosen from zirconium, strontium, barium, magnesium, zinc, calcium, titanium, and potassium pigments, and a first polymer, with a second polymer such that the resin (masterbatch) comprising the white pigment comprises between about 5 to 50% by weight of the total mixture.

In certain embodiments the white pigment or combination of pigments may be selected from zirconium dioxide, magnesium zirconate, calcium zirconate, strontium zirconate, barium zirconate, zirconium silicate, zinc sulphide, calcium carbonate, barium sulphate, magnesium oxide, strontium carbonate, barium carbonate, titanium dioxide, and potassium oxide.

In some embodiments the material may incorporate a compound or compounds added to cause or increase the extent to which the material reflects and/or absorption of radiation from the earth (terrestrial (long wave or infrared) radiation). Thus when the material is placed over or adjunct to plants it will assist in retaining heat beneath the material, which may be desirable for some plants or applications.

In some further embodiments the material may incorporate a compound or compounds added to cause or increase the extent to which the material allows transmission and/or absorption of radiation from the earth (terrestrial (long wave or infrared) radiation). Thus when the material is placed over or adjacent to plants it will assist in releasing the heat beneath the material, which may be desirable for some plants or applications.

In yet another embodiment the material may incorporate a compound or compounds added to cause or increase the extent to which the material reflects and/or absorbs solar radiation. Thus when the material is placed over or adjunct to plants it will assist in cooling beneath the material, which may be desirable for some plants or applications.

In a further embodiment the material may incorporate a compound or compounds added to cause or increase the extent to which the material allows transmission and/or absorption of solar radiation. Thus when the material is placed over or adjunct to plants it will assist in increasing the heat beneath the material, which may be desirable for some plants or applications.

In broad terms in another aspect the invention comprises a method of treating a plant or fruit or vegetables thereon which comprises providing over and/or adjacent the plant as bird netting, insect netting, shadecloth netting, windbreak netting, or hail protection netting a reflective netting material knitted, woven or non-woven from a synthetic monofilament, yarn, or tape or a combination thereof, formed from a resin comprising more than 4% by weight of at least one white pigment chosen from zirconium, strontium, barium, magnesium, zinc, titanium, calcium, and potassium pigments.

In broad terms in another aspect the invention comprises a method of treating a plant or fruit or vegetables thereon which comprises providing over and/or adjacent the plant as bird netting, insect netting, shadecloth netting, windbreak netting, or hail protection netting a reflective netting material knitted, woven or non-woven from a synthetic monofilament, yarn, or tape or a combination thereof, formed from a resin comprising more than 8% by weight of at least one white pigment chosen from zirconium, strontium, barium, magnesium, zinc, titanium, calcium, and potassium pigments.

In broad terms in another aspect the invention comprises a method of treating a plant or fruit or vegetables thereon which comprises providing over and/or adjacent the plant as bird netting, insect netting, shadecloth netting, windbreak netting, or hail protection netting a reflective netting material knitted, woven or non-woven from a synthetic monofilament, yarn, or tape or a combination thereof formed from a resin comprising at least one white pigment, which resin has been formed by mixing a masterbatch consisting essentially of 10 to 90% by weight of at least one white pigment chosen from zirconium, strontium, barium, magnesium, zinc, titanium, calcium, and potassium pigments, and a first polymer such that the resin (masterbatch) comprising the white pigment comprises between about 4 to 50% by weight of the total mixture.

In broad terms in another aspect the invention comprises a method of treating a plant or fruit or vegetables thereon which comprises providing over and/or adjacent the plant as bird netting, insect netting, shadecloth netting, windbreak netting, or hail protection netting a reflective netting material knitted, woven or non-woven from a synthetic monofilament, yarn, or tape or a combination thereof formed from a resin comprising a white pigment, which resin has been formed by mixing a masterbatch consisting essentially of 20 to 90% by weight of at least one white pigment chosen from zirconium, strontium, barium, magnesium, zinc, titanium, calcium, and potassium pigments, and a first polymer such that the resin (masterbatch) comprising the white pigment comprises between about 5 to 50% by weight of the total mixture.

By "netting" is meant:
  in the case of knitted material, material having a cover factor (as herein defined) of up to 98% but typically less than 95%, 90%, 80%, 70%, 60%, 50%, 40%, 30%, 20%, 10% or 5%;
  in the case of woven material, material having a cover factor (as herein defined) less than 85% or 80% but typically less than 70%, 60%, 50%, 40%, 30%, 20%, 10% or 5%; and
  in the case of non-woven material, material having a cover factor (as herein defined) of up to 98% but typically less than 95%, 90%, 80%, 70%, 60%, 50%, 40%, 30%, 20%, 10% or 5%.

By "cover factor" is meant the percentage of the overall area of the netting material which comprises knitted, woven, or non-woven monofilament, yarn, or tape or a combination, forming the netting itself, judged from perpendicular to the plane of the netting when laid out flat, as opposed to air space in between the netting. Thus if a netting has a cover factor of 30% then the air space through the netting would be 70% of the total area of the netting.

By "reflective" in general is meant that the material is reflective of at least 40% on average of visible light or of energy across any particular wavelength range of interest, more preferably at least 50% or 60% or 70% or 80% or 90%, on at least one side of the netting material. At some wavelengths within the particular wavelength range of interest the material may be less reflective, so long as the average of the reflectance of the material at all wavelengths across the wavelength range of interest is at least the minimum specified.

"Woven netting" includes extruded netting, comprising crossed strands heat welded or chemically bonded together.

BRIEF DESCRIPTION OF THE DRAWINGS

The invention is further described by way of example with reference to the accompanying drawings in which.

DETAILED DESCRIPTION OF THE EMBODIMENTS

Figure 1:
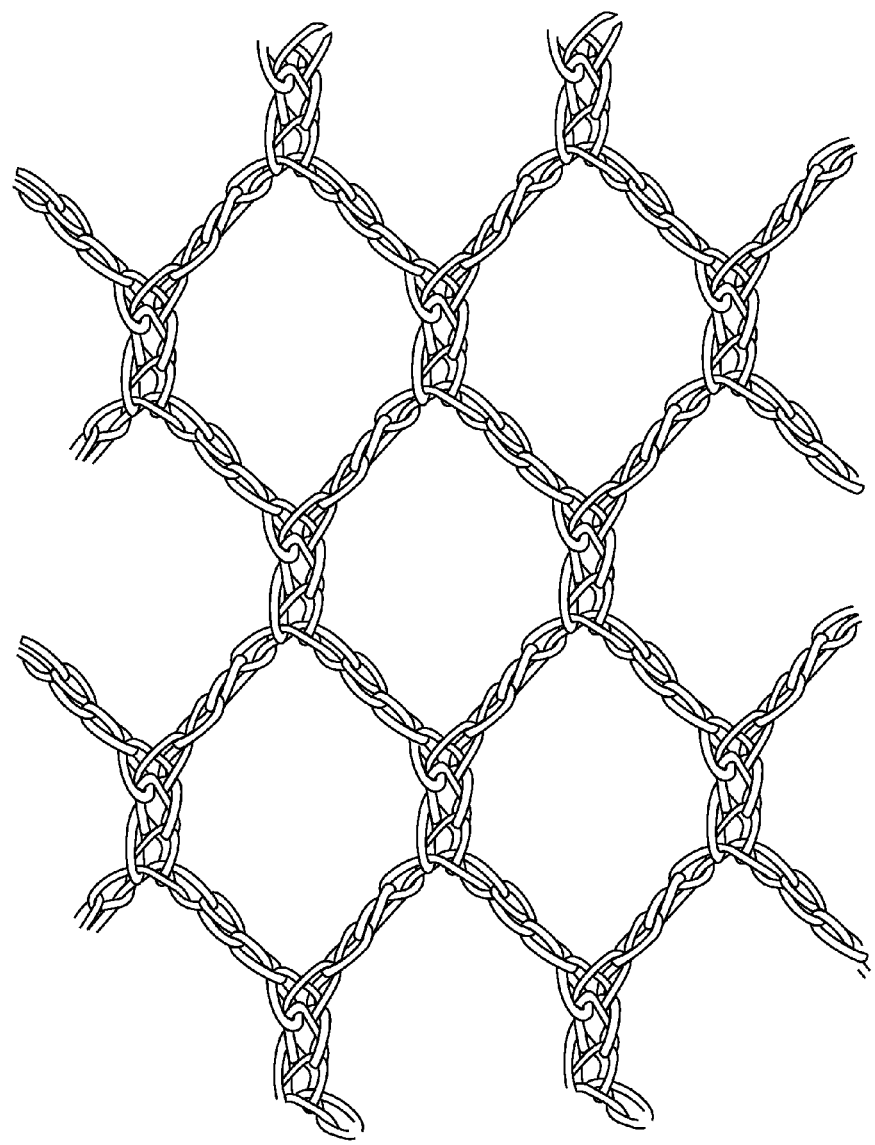
FIG. 1 shows a section of one form of knitted hexagonal monofilament netting, having a cover factor of approximately 5-10%

Netting material of the invention may be knitted, woven or non-woven from a synthetic monofilament, yarn (multifilament), or tape or a combination thereof, formed from a resin comprising sufficient of at least one white pigment that the netting is reflective as referred to previously.

In one embodiment the monofilament, yarn, or tape is formed from a resin comprising at least one white pigment, which resin has been formed by mixing a masterbatch consisting essentially of 10 or 20 to 90% by weight of the white pigment(s) and a first polymer, with a second polymer. The "first polymer" may be a mixture of polymers as may the second polymer. The masterbatch may be in the form of thermoplastic granules. The white pigment(s) may be added to the first polymer or mix of polymers when heated to be liquid or flowable and is vigorously mixed to distribute the pigment evenly, and the first polymer comprising the mixed white pigment(s) is then formed into solid granules on cooling. The first polymer or polymers acts to bind the white pigment(s) into granules enabling solid granulation of the mixture, the masterbatch; for ease of handling in a subsequent monofilament, yarn, fibre, or tape manufacturing process. The masterbatch is then mixed with a second polymer and may be mixed in a let down range of 4 or 5 to 50% of the masterbatch to the second polymer or polymers, to form the mixture from which the monofilament, yarn, or tape is then manufactured. Monofilament may be extruded; synthetic yarn may be formed by known methods including extrusion of individual fibres which are then twisted to form a yarn. Tape may be extruded directly or the resin may be extruded into sheet form which may then be cut to tapes suitable for knitting or weaving into netting. Nonwoven netting may be formed by random binding at numerous irregular crossing points, of thermoplastic monofilament, yarn, or tape, by application of heat and pressure.

The first polymer and the second polymer may be the same or different and may be any suitable polyolefin such as polyethylene or polypropylene, for example, or a mixture thereof, or an ethylene alpha-olefin, or a polyester, or a biopolymer, or a blend of any of the foregoing. Certain plastics are particularly useful when present as minor or major components. Ethylene vinyl acetate (EVA), ethylene butyl acrylate (EBA) and ethylene methyl acrylate (EMA) are useful for imparting elasticity and other properties. Polyesters and polystyrene, styrene butadiene (SB), acrylonitrile-butadiene styrene (ABS), styrene-acrylonitrile (SAN), polyethylene terephthalate (PET), polymethylmethacrylate (PMMA) and polycarbonate are useful as dye carriers and also for influencing radiation (reflecting, absorbing and transmission) properties and also other properties on the materials. Starch and other plant polymers are useful to increase biodegradability. Alternatively the material may comprise in part or whole of paper, wood or cellulose fibre, starch based polymers, casein, latex or in any combination of the above and/or with petroleum derived plastic polymers. In addition to the white pigment the polymer or polymer blend may incorporate other agents such as a UV stabiliser or combination of stabilisers and processing aid or aids.

The white pigment(s) may be chosen from zirconium, strontium, barium, magnesium, titanium, and calcium pigments. In certain embodiments the white pigment may be selected from zirconium dioxide, magnesium zirconate, calcium zirconate, strontium zirconate, barium zirconate, zirconium silicate, zinc sulphide, calcium carbonate, barium sulphate, magnesium oxide, strontium carbonate, barium carbonate, titanium dioxide, and potassium oxide. The white pigment may also consist of or include a $K_2O.TiO_2$ composition.

In some embodiments sufficient white pigment is incorporated in the monofilament, yarn, or tape such that it reflects at least 30 or 40% of the solar radiation on average in the UV (wavelength about 280-400 nm), visible (wavelength about 400-700 nm) and very near infrared (wavelength about 700-800 nm) ranges, and transmits at least 10% or 5% on average of solar radiation in the wavelength range about 800-2500 nm.

As referred to previously in some embodiments the material may also incorporate a compound or compounds added to increase the extent to which the material reflects and/or absorbs radiation from the earth when the material is placed over or adjacent to plants.

As referred to previously in some embodiments the material may also incorporate a compound or compounds added to increase the extent to which the material transmits and/or absorbs radiation from the earth when the material is placed over or adjacent to plants.

As referred to previously in some embodiments the material may also incorporate a compound or compounds added to increase the extent to which the material reflects and/or absorbs solar radiation when the material is placed over or adjacent to plants.

As referred to previously in some embodiments the material may also incorporate a compound or compounds added to increase the extent to which the material transmits and/or absorbs solar radiation when the material is placed over or adjacent to plants.

In some embodiments the material is of denier 50 to 2000 or 100 to 1000 and most typically 300 to 800 or 400 to 600.

The material may be constructed to have a higher knitted or woven or non-woven density in parallel side margins of the material, so that these side margins of the material are stronger.

FIGS. 1 to 6 show by way of example sections of netting material.

FIG. 1 shows a section of one form of knitted hexagonal monofilament netting. The netting has a cover factor of approximately 5-10%. The netting is knitted in a hexagonal structure of around 8 mm across.

Figure 2:
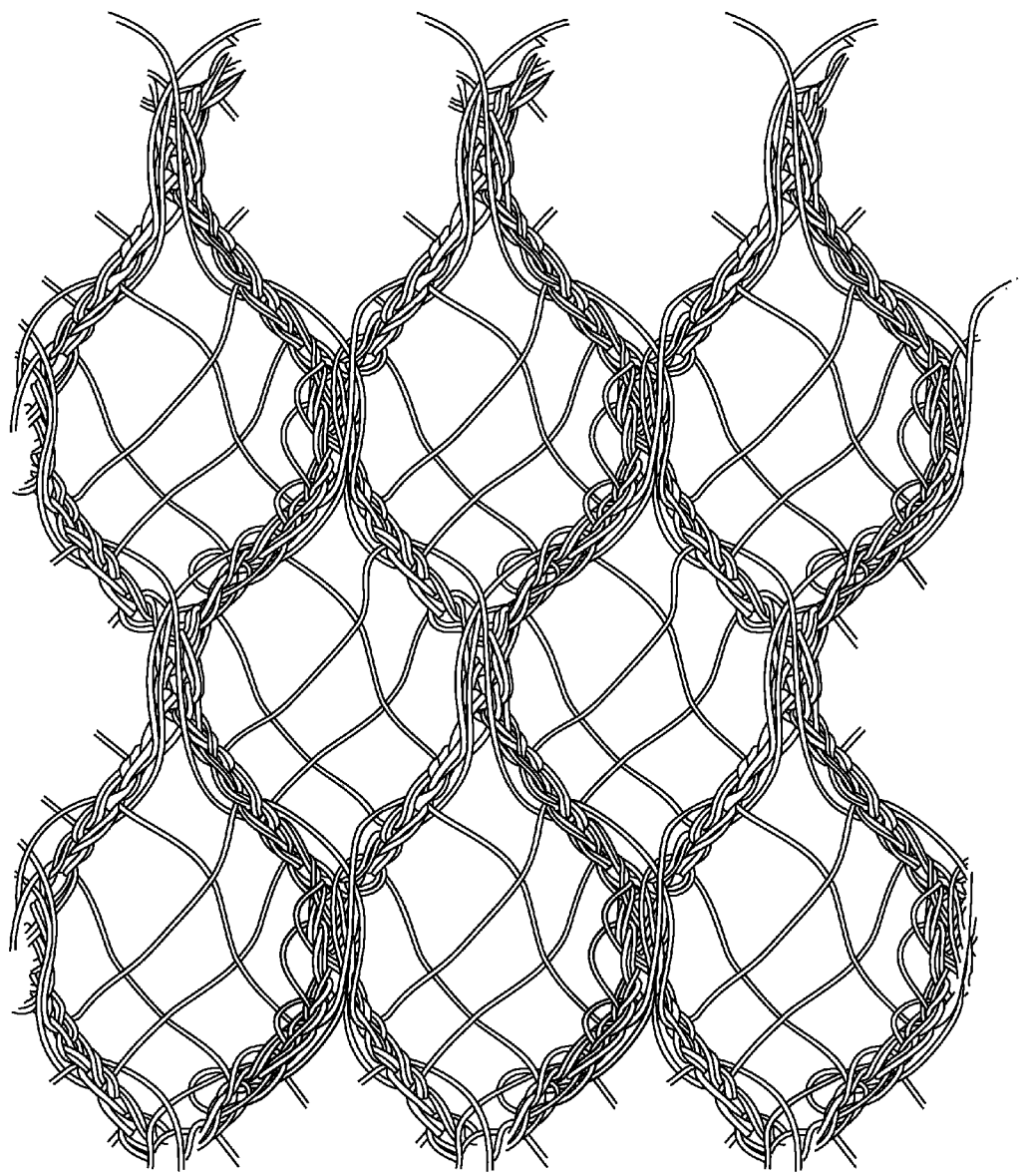
FIG. 2 shows a section of another form of knitted hexagonal monofilament netting, having a cover factor of approximately 20-25%

FIG. 2 shows a section of another form of knitted hexagonal monofilament netting. The netting has a cover factor of approximately 20-25%. The netting is knitted in a hexagonal structure of around 13 mm across but with additional strands of monofilament across the hexagonal.

Figure 3:
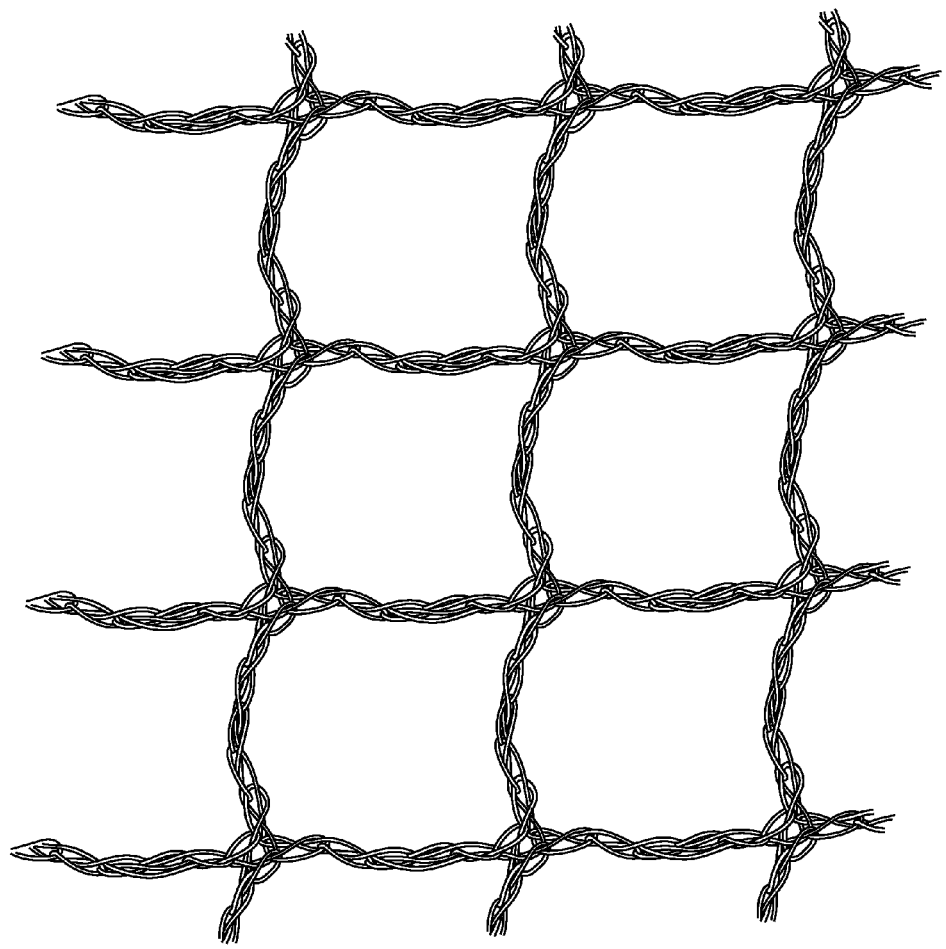
FIG. 3 shows a section of one form of knitted diamond monofilament netting, having a cover factor of approximately 5-10%

FIG. 3 shows a section of one form of knitted diamond monofilament netting. The netting has a cover factor of approximately 5-10%. The netting is knitted in a diamond structure of around 15 mm across the diamond.

Figure 4:
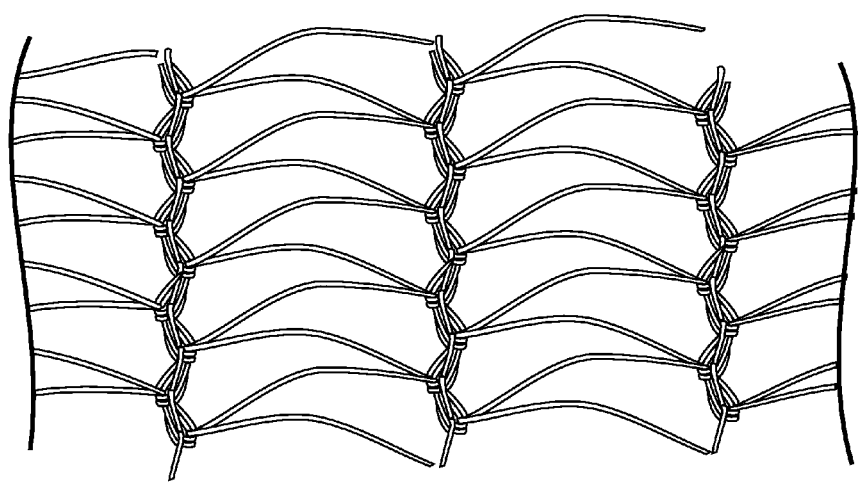
FIG. 4 shows a section of another faun of knitted pillar based monofilament netting, having a cover factor of approximately 15-20%.

FIG. 4 shows a section of another form of knitted pillar based monofilament netting. The netting has a cover factor of approximately 15-20%. The pillars are joined by monofilaments across the pillars.

Figure 5:
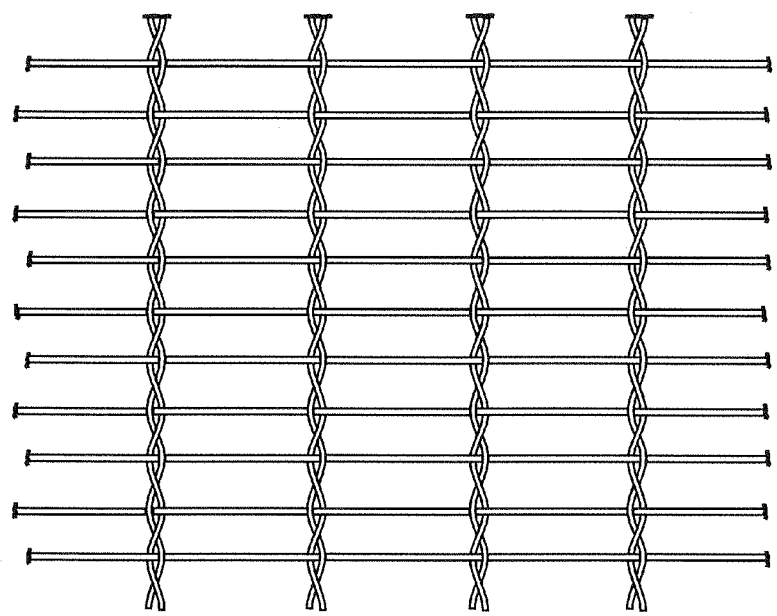
FIG. 5 shows a section of one form leno woven based monofilament netting, having a cover factor of approximately 20-25%.

FIG. 5 shows a section of one form leno woven based monofilament netting. The netting has a cover factor of approximately 20-25%. The leno construction has the warp monofilaments wrap around, over and under the weft monofilaments.

Figure 6:
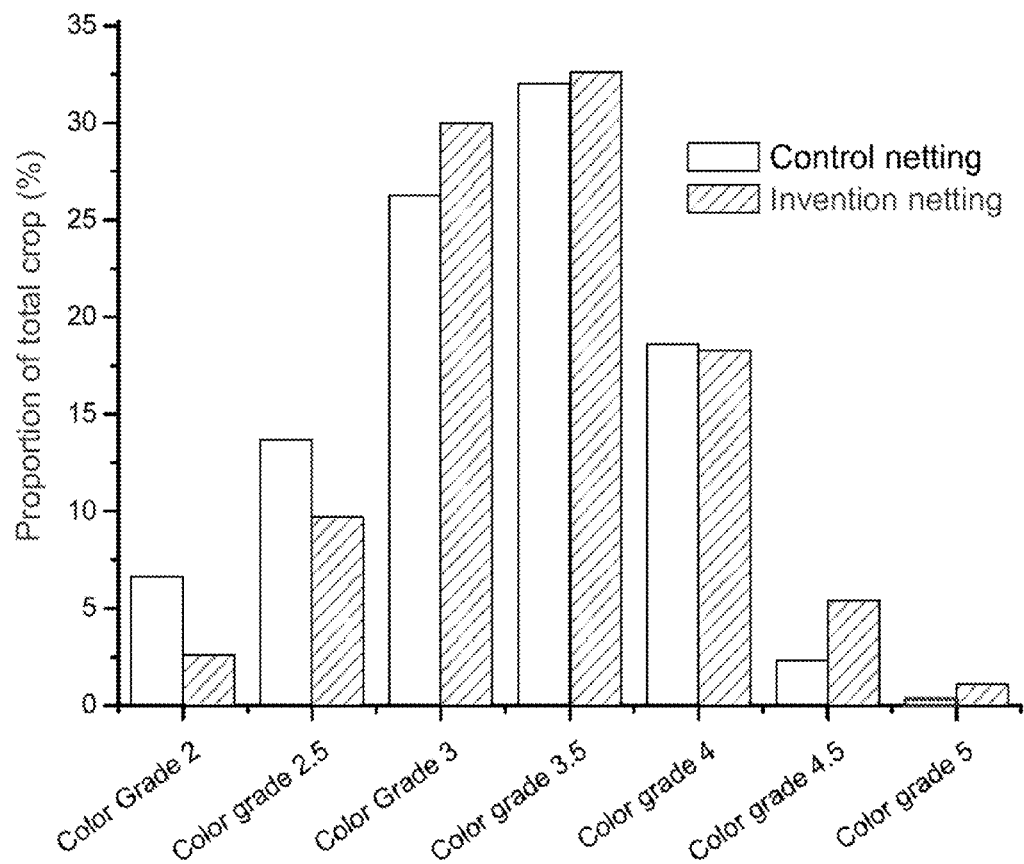
FIG. 6 shows fruit colour grade rating results referred to in the subsequent description of trials work with netting of the invention and control netting.

FIG. 6 shows a section of another form of an extruded woven netting having a diamond aperture structure with apertures around 20 mm across at widest.

Typically reflective netting of the invention has a cover factor of 50% or less. Where the netting is knitted shade cloth however, for example, it may have a higher cover factor, up to 95% but typically still less than 70%. Where the netting is woven shade cloth however, for example, it may have a higher cover factor, up to 85% but typically still less than 70%.

In some embodiments reflective netting of the invention may comprise air space apertures through the material of widest dimension about 30mm. In other embodiments reflective netting of the invention may comprise air space apertures through the material of widest dimension about 20mm. In some embodiments reflective netting of the invention may comprise air space apertures through the material of widest dimension in the range 10-30mm.

As referred to previously the netting may be knitted or woven or formed in a non-woven construction, from monofilament, yarn, or tape or a combination. Yarn may comprise multiple synthetic fibres twisted together (multifilaments). Tape may for example be formed by extruding synthetic sheet material from the resin, and then cutting the extruded sheet material to form long tapes of typically 1 to 5 mm of width.

The yarn or tape from which the netting is formed has high reflectance, and reflects at least 30 or 40% more preferably at least 50% or 60% or 70% or 80% or 90% or more of at least UV and visible light.

Typically the netting is supported over the plant(s) and/or as a vertical and/or angled wall or walls near the plant(s), or on the ground itself, by for example cables or wires between posts positioned along the rows of plants in a garden, field-crop, orchard or vineyard, or is draped over the plant(s),as bird netting, insect netting (for repelling for example mosquitoes, or as for example bee exclusion netting), shadecloth netting, windbreak netting, or hail protection. Netting may be placed near plants to protect for example annual plants, perennial plants, fruit trees, or grape vines, vegetable plants, from birds, insects, excessive sun, wind, or hail. The netting is reflective or highly reflective due to relatively high content of the white pigment(s) referred to above, of UV and visible light incident on the netting i.e. on the monofilament, yarn, or tapes thereof, is reflected. A small portion of incident light hits the netting such that it is reflected away but most light although undergoing a change in direction due to reflection from the netting nonetheless enters the netting canopy but is diffused, and hits the plants and particularly fruit or vegetables below or adjacent the netting canopy and creates an environment that is favourable for plant growth and/or fruit or vegetable development, and an environment suited to beneficial organisms (insects, bacteria and fungi etc.) and less favoured by non beneficial organisms of the plant or fruits or vegetables. Light not hitting the netting passes directly through the netting air space to the plants and fruit. An advantage of the UV reflectance may be that the netting is more visible to insects and birds and thus more effective at repelling insects and birds because it forms a visible (or behavioural) as well as mechanical barrier.

The following description of trials work further illustrates and demonstrates the invention:

Trial

Some trees in a young Honey Crisp apple orchard block in Washington State, USA were covered in May (early summer) with a control netting and other trees nearby in the same orchard were covered with netting of an embodiment of the invention. Both nettings were knitted from monofilament in a hexagonal structure and were similar to that of FIG. 1, and comprised hexagonal apertures around 8 mm across. Both nettings had a cover factor of approximately 20%. The monofilament of the control netting comprised polyethylene with 5% by weight titanium dioxide as a white pigment. The monofilament of the netting of the invention comprised polyethylene with 14% calcium carbonate as a white pigment. The control netting and the netting of the invention were used to cover the trees in the same way. The netting remained in place until harvest.

Colour Rating

At harvest fruit samples were taken to evaluate the level of colouration. In particular 20 trees were individually sampled at each of two harvests with up to a 10 fruit sample collected from each tree. Each individual fruit was then rated for its colour grade and presence of sunburn. The colour rating scale used was:

Colour grade 1: 25% light blush
Colour grade 2: 50- 75% light blush
Colour grade 3: 50% bright red or 75% mid red blush
Colour grade 4: 50% bright red or 100% mid red blush
Colour grade : >90% bright red blush Grades were measured in 0.5 grade units Results The colour grade rating results are shown in FIG. 6, in which shaded bars are for fruit from trees covered with netting of the invention and the non-shaded bars are for fruit from trees covered with the control netting. Data from the two harvests has been combined.

The fruit from trees covered with netting of the invention produced less low colour grade fruit (color grades 2.5 and below), and more high colour grade fruit (color grades 4 and above). Both the control and netting of the invention had a similar effect on reduction of fruit sunburn. Thus the netting of the invention reduced sunburn to a similar extent as the control shadecloth netting, but with improved development of fruit colouration. The improved fruit colouration may be due to higher UV reflectance. Both nettings are believed to have had similar reflectance of visible light.

The foregoing describes the invention including a preferred form thereof, alterations and modifications as will be obvious to those skilled in the art are intended to be incorporated in the scope hereof, as defined in the accompanying claims.

The invention claimed is:

1. A reflective netting material for placement in an elevated position above the ground and over fruit- or vegetable-bearing plants, said netting material comprising a knitted, woven, or non-woven structure, from a synthetic monofilament, yarn, or tape or combination thereof formed from a resin comprising at least one pigment such that the monofilament, yarn, or tape reflects at least 30% solar radiation on average across the UV (wavelength about 280-400 nm), visible (wavelength about 400-700 nm) and very near infrared (wavelength about 700-800 nm) ranges, and which transmits at least 10% on average of solar radiation across the wavelength range about 800-2500 nm, and which reflective netting material has a cover factor (as herein defined) of less than 90%, said netting material operable to create a plant environment beneath the material which is favorable for the growth of said plants and/or the development of fruit or vegetables borne by the plants, by virtue of diffusion of incident radiation including UV radiation by the netting material.

2. A reflective netting material according to claim 1 which is knitted, woven, or non-woven, from a synthetic monofilament, yarn, or tape or combination thereof which reflects more solar radiation than it transmits and absorbs in the UV, visible, and very near infrared ranges.

3. A reflective netting material according to claim 1 which is knitted, woven, or non-woven, from a synthetic monofilament, yarn, or tape or combination thereof which transmits at least 15% of solar radiation on average in the wavelength range about 800-2500 nm.

4. A reflective netting material according to claim 1 which is knitted, woven, or non-woven, from a synthetic monofilament, yarn, or tape or combination thereof which transmits at least 20% of solar radiation on average in the wavelength range about 800-2500 nm.

5. A reflective netting material according to claim 1 which has a cover factor (as herein defined) of less than 50%.

6. A reflective netting material according to claim 1 which has a cover factor (as herein defined) of less than 20%.

7. A reflective netting material according to claim 1 which is reflective of at least 50% on average of visible light on at least one side of the netting material.

8. A reflective netting material according to claim 1 which is knitted, woven, or non-woven, from a synthetic monofilament, yarn, or tape or combination thereof formed from a resin comprising at least 4% by weight of at least one white pigment.

9. A reflective netting material according to claim 8 wherein the white pigment comprises a zirconium, strontium, barium, magnesium, zinc, calcium, titanium, or potassium pigment or a combination thereof.

10. A reflective netting material according to claim 1 wherein the material is of denier 50 to 2000.

11. A reflective netting material according to claim 1 wherein the material comprises air space apertures through the material of widest dimension about 20 mm.

12. A reflective netting material according to claim 1 wherein the material comprises air space apertures in the range 10-20 mm.

13. A reflective netting material according to claim 1 constructed to have a higher density in stronger parallel side margins of the material.

14. A reflective netting material according to claim 1, including means for maintaining said netting material in said elevated position above the ground and selected from the group consisting of support poles, parts of said plants, and combinations thereof.

15. A reflective netting material for placement in an elevated position above the ground and over fruit- or vegetable-bearing plants, said netting material comprising a knitted, woven, or non-woven structure, from a synthetic monofilament, yarn, or tape or combination thereof formed from a resin comprising at least one pigment such that the monofilament, yarn, or tape reflects at least 40% solar radiation on average across the UV (wavelength about 280-400 nm), visible (wavelength about 400-700 nm) and very near infrared (wavelength about 700-800 nm) ranges, and which transmits at least 5% on average of solar radiation across the wavelength range about 800-2500 nm, said netting material operable to create a plant environment beneath the material which is favorable for the growth of said plants and/or the development of fruit or vegetables borne by the plants, by virtue of diffusion of incident radiation UV radiation by the netting material.

16. A reflective netting material according to claim 15 which reflects at least 10% on average of solar radiation across the wavelength range about 800-2500 nm.

17. A reflective netting material according to claim 15 which is knitted, woven or non-woven, from a synthetic monofilament, yarn, or tape or combination thereof which reflects more solar radiation than it transmits and absorbs in the UV, visible, and very near infrared ranges.

18. A reflective netting according to claim 15 which is knitted, woven, or non-woven, from a synthetic monofilament, yarn, or tape or combination thereof which transmits at least 15% of solar radiation on average in the wavelength range about 800-2500 nm.

19. A reflective netting material according to claim 15 which is knitted, woven, or non-woven, from a synthetic monofilament, yarn, or tape or combination thereof which transmits at least 20% of solar radiation on average in the wavelength range about 800-2500 nm.

20. A reflective netting material according to claim 15 which has a cover factor, (as herein defined) of less than 50%.

21. A reflective netting material according to claim 15 which has a cover factor, (as herein defined) of less than 20%.

22. A reflective netting material according to claim 15 which is reflective of at least 50% on average of visible light on at least one side of the netting material.

23. A reflective netting material according to claim 15 which is knitted, woven, or non-woven, from a synthetic monofilament, yarn, or tape or combination thereof formed from a resin comprising at least 4% by weight of at least one white pigment.

24. A reflective netting material according to claim 23 wherein the white pigment comprises a zirconium, strontium, barium, magnesium, zinc, calcium, titanium, or potassium pigment or a combination thereof.

25. A reflective netting material according to claim 15 wherein the material is of denier 50 to 2000.

26. A reflective coating material according to claim 15 wherein the material comprises air space apertures through the material of widest dimension about 20 mm.

27. A reflective netting material according to claim 15 wherein the material comprises air space apertures in the range of 10-20 mm.

28. A reflective netting material according to claim 15 constructed to have a higher density in stronger parallel side margins of the material.

29. A reflective netting material according to claim 15, including means for maintaining said netting material in said elevated position above the ground and selected from the group consisting of support poles, parts of said plants, and combinations thereof.

30. A method comprising the steps of placing over fruit- or vegetable-bearing plants, and in an elevated position above the ground, a netting comprising a knitted, woven, or non-woven structure, from a synthetic monofilament, yarn, or tape or combination thereof formed from a resin comprising at least one pigment such that the monofilament, yarn, or tape reflects at least 30% solar radiation on average across the UV (wavelength about 280-400 nm), visible (wavelength about 400-700 nm) and very near infrared (wavelength about 700-800 nm) ranges, and which transmits at least 10% on average of solar radiation across the wavelength range about 800-2500 nm, and which reflective netting material has a cover factor (as herein defined) of less than 90%, said netting material operable to create a plant environment beneath the material which is favorable for the growth of said plants and/or the development of fruit or vegetables borne by the plants, by virtue of diffusion of incident radiation UV radiation by the netting material.

31. A method according to claim 30, wherein said material is knitted, woven, or non-woven, from a synthetic monofilament, yarn, or tape or combination thereof which reflects more solar radiation than it transmits and absorbs in the UV, visible, and very near infrared ranges.

32. A method according to claim 30, wherein said material is knitted, woven, or non-woven, from a synthetic monofilament, yarn, or tape or combination thereof which transmits at least 15% of solar radiation on average in the wavelength range about 800-2500 nm.

33. A method according to claim 30, wherein said material is knitted, woven, or non-woven, from a synthetic monofilament, yarn, or tape or combination thereof which transmits at least 20% of solar radiation on average in the wavelength range about 800-2500 nm.

34. A method according to claim 30, wherein said material has a cover factor (as herein defined) of less than 50%.

35. A method according to claim 30, including the steps of locating said netting material above the ground by supporting the netting material on poles, by parts of said plants, or combinations thereof.

* * * * *